M. P. BRAY.
Fastenings for Corsets.
No. 4,858. Reissued April 9, 1872.
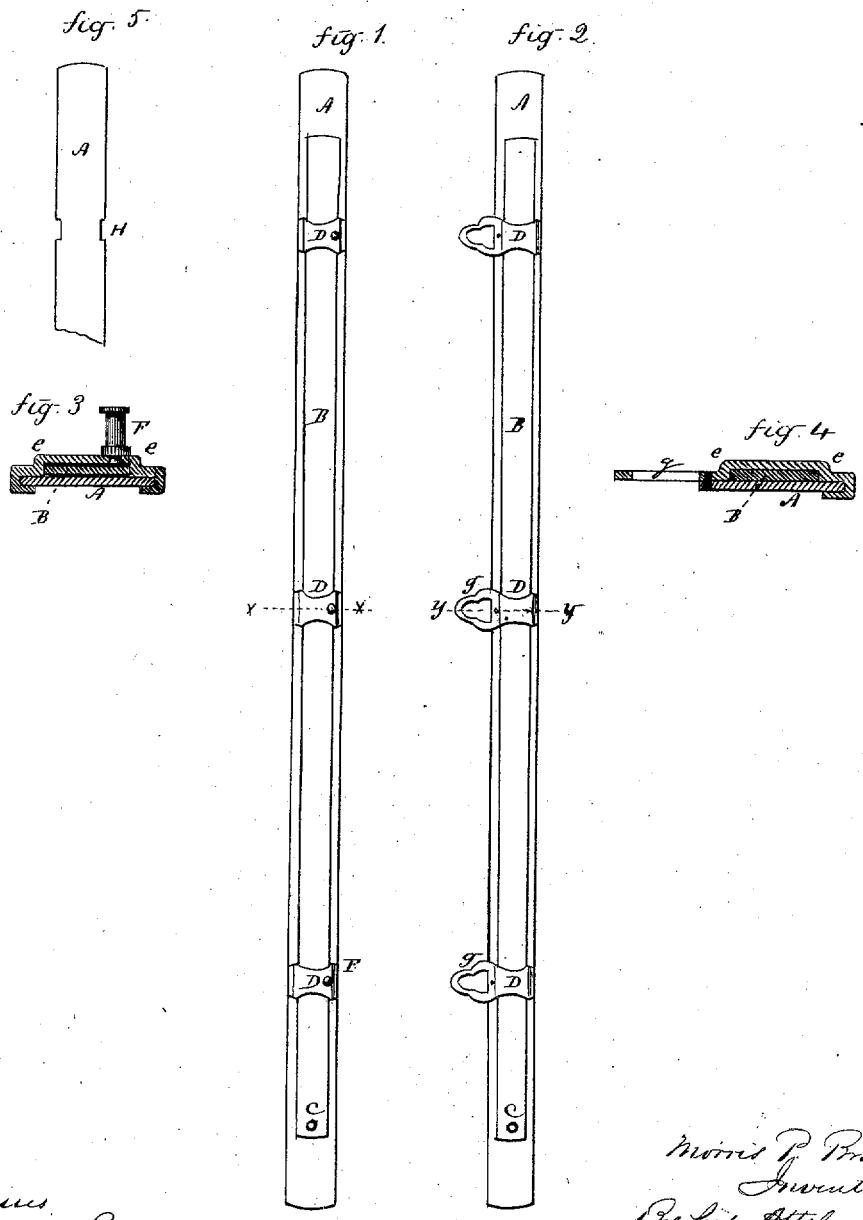
Witnesses
J. H. Shumway
A. J. Tibbitts
Morris P. Bray
Inventor
By his Attys
Thos. E. Earle
AM. PHOTO-LITHOGRAPHIC CO. N.Y. (OSBORNE'S PROCESS.)

UNITED STATES PATENT OFFICE.

MORRIS P. BRAY, OF NEW HAVEN, ASSIGNOR OF ONE-HALF HIS INTEREST TO THE SHELTON AND OSBORN MANUFACTURING COMPANY, OF DERBY, CONNECTICUT.

IMPROVEMENT IN FASTENINGS FOR CORSETS.

Specification forming part of Letters Patent No. 100,970, dated March 22, 1870; reissue No. 4,858, dated April 9, 1872.

*To all whom it may concern:*

Be it known that I, MORRIS P. BRAY, of New Haven, in the county of New Haven and State of Connecticut, have invented a new Improvement in Fastenings for Corsets; and I do hereby declare the following, when taken in connection with the accompanying drawing and the letters of reference marked thereon, to be a full, clear, and exact description of the same, and which said drawing constitutes part of this specification, and represents, in—

Figures 1 and 2, front views of a pair, which together constitute the fastening of a corset; Fig. 3, a transverse section of one part on line *x x;* Fig. 4, a transverse section of the other part on line *y y;* and in Fig. 5, a portion of one of the steels, to illustrate a manner of holding the clasps in position.

This invention relates to an improvement in corset-fastenings, commonly called corset-steels—that is to say, the device which is inserted into each edge of the corset at the front as a means of securing the two edges together; the object of the invention being to combine an auxiliary spring with the principal spring, whereby the liability to break is avoided; and it consists in an auxiliary spring upon one surface of the principal spring, secured in position at a single point to retain the said auxiliary spring in its proper position, and yet allow the two to slide freely (longitudinally) one upon the other in bending; and combining with the said principal and auxiliary spring one or more clasps which embrace the two springs, the said clasps formed and applied so as to prevent the transverse movement of the said auxiliary spring upon the surface of the principal spring.

A is the principal spring, in length and width substantially of the usual form. B is the auxiliary spring, formed from suitable metal and fitted to one surface of the principal spring. To prevent the auxiliary spring from moving out of position longitudinally, I secure the auxiliary spring at one point only, here represented as by a rivet, C. This allows the springs to bend; the auxiliary spring, in so bending, slides freely longitudinally on the surface of the principal spring, and cannot get out of place longitudinally, because of its being secured in position at one point; but this securing at one point does not in any way interfere with the elasticity or free longitudinal movement of one upon the other. To secure the two springs, and prevent one springing up from the other, clasps D are formed to embrace both springs, securely attached to the principal spring, but allowing the free longitudinal movement of the auxiliary spring. As the auxiliary spring B is, by preference, made narrower than the principal spring, in order to prevent the transverse movement of the said auxiliary spring—that is, swinging to the right or left—I form the clasps with shoulders *e*—that is, make the central portion of the clasps raised so as to extend over the auxiliary spring, and form a bearing at each side of the said auxiliary spring—the said clasp forming, as it were, a loop through which the auxiliary spring extends, and which effectually prevents the transverse movement of the auxiliary spring. The clasps on one spring are provided with hooks, pins, or buttons F, and the other with eyes or slots *g*, to engage each other, as a means of securing together. To obviate the necessity of riveting the clasps to the spring A, and preventing their slipping on the springs, I form indentations H in one or both edges of the spring A, as seen in Fig. 5, into which the clasps are made to fit.

I am aware that corset-fastenings have heretofore been made with double springs; but such springs have been so fastened together that their elasticity is in a measure destroyed—that is to say, secured at two or more points, which serves only to stiffen the spring, and this done at the expense of elasticity. By fastening them at one point the elasticity of the two springs is secured throughout their entire length, thus rendering this fastening much more flexible and durable than those made in the ordinary manner.

I claim as my invention—

A corset-fastening consisting of a main spring, A, upon which is secured an auxiliary spring, B, by means of the shouldered or recessed clips D, the said spring B being secured at a single point to prevent longitudinal displacement.

MORRIS P. BRAY.

Witnesses:
JOHN H. SHUMWAY,
A. J. TIBBITS.